United States Patent
Dao et al.

(10) Patent No.: US 9,894,421 B2
(45) Date of Patent: Feb. 13, 2018

(54) SYSTEMS AND METHODS FOR DATA REPRESENTATION AND TRANSPORTATION

(71) Applicant: Huawei Technologies Co., Ltd., Shenzhen (CN)

(72) Inventors: Ngoc Dung Dao, Ottawa (CA); Aaron James Callard, Ottawa (CA); Hang Zhang, Nepean (CA); Ho Ting Cheng, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 717 days.

(21) Appl. No.: 13/657,559

(22) Filed: Oct. 22, 2012

(65) Prior Publication Data
US 2014/0115094 A1 Apr. 24, 2014

(51) Int. Cl.
*G06F 15/16* (2006.01)
*H04N 21/61* (2011.01)
(Continued)

(52) U.S. Cl.
CPC ....... *H04N 21/6125* (2013.01); *H04L 65/607* (2013.01); *H04L 69/04* (2013.01);
(Continued)

(58) Field of Classification Search
None
See application file for complete search history.

(56) References Cited

U.S. PATENT DOCUMENTS 5,852,706 A * 12/1998 Ogikubo .............. H04N 9/8042
375/E7.148
6,882,637 B1 * 4/2005 Le ........................ H04L 1/0082
341/60
(Continued)

FOREIGN PATENT DOCUMENTS

CN 1409915 A 4/2003
CN 101031085 A 9/2007
(Continued)

OTHER PUBLICATIONS

"3rd Generation Partnership Project; Technical Specification Group Services and System Aspects; Transparent end-to-end Packet-Switched Streaming Service (PSS); Progressive Download and Dynamic Adaptive Streaming over HTTP (3GP-DASH) (Release 10)," 3GPP TS 26.247 v10.1.0, Nov. 2011, 111 pages.
(Continued)

*Primary Examiner* — Younes Naji
(74) *Attorney, Agent, or Firm* — Slater Matsil, LLP

(57) ABSTRACT

Systems and methods reduce redundancy in a data representation. The data is divided into a plurality of data portions. The data portions are used to encode a plurality of compressed data portions, wherein the compressed data portions correspond to a subset of the data portions and comprise less redundant data than the subset of the data portions. The compressed data portions are also encoded in accordance with data in the remaining data portions. The compressed data portions are transmitted instead of the subset of the data portions with the remaining data portions
(Continued)

according to a sequence of data portions. Each of the compressed data portions is transmitted upon receiving an acknowledgment message that indicates successful transmission of a previous data portion or compressed data portion in the sequence of data portions.

32 Claims, 12 Drawing Sheets

(51) Int. Cl.
  *H04L 29/06* (2006.01)
  *H04N 21/6437* (2011.01)
  *H04N 21/6583* (2011.01)
  *H04N 21/845* (2011.01)

(52) U.S. Cl.
  CPC ..... *H04N 21/6437* (2013.01); *H04N 21/6583* (2013.01); *H04N 21/8456* (2013.01)

(56) References Cited

U.S. PATENT DOCUMENTS

| | | | | |
|---|---|---|---|---|
| 7,885,338 | B1* | 2/2011 | Bushell | G11B 27/005 375/240.25 |
| 8,245,092 | B2* | 8/2012 | Kotecha | H04L 1/1812 714/748 |
| 8,966,123 | B2* | 2/2015 | Gochi Garcia | H04L 69/04 370/389 |
| 2003/0182127 | A1* | 9/2003 | Pan | G10L 19/18 704/270.1 |
| 2004/0098495 | A1* | 5/2004 | Warren | G06F 9/544 709/230 |
| 2005/0008012 | A1* | 1/2005 | Koren | H04L 29/06 370/389 |
| 2006/0174026 | A1* | 8/2006 | Robinson | H04N 7/17336 709/231 |
| 2007/0183380 | A1* | 8/2007 | Rensburg | H04B 7/0452 370/338 |
| 2008/0037465 | A1 | 2/2008 | Ngo et al. | |
| 2010/0229064 | A1* | 9/2010 | Omeni | H04L 1/1803 714/749 |
| 2010/0287274 | A1* | 11/2010 | Martinez | H04L 65/602 709/224 |
| 2012/0054876 | A1* | 3/2012 | Johansson | H04N 21/8455 726/28 |
| 2012/0260145 | A1* | 10/2012 | Yang | H03M 13/1515 714/758 |
| 2013/0262704 | A1* | 10/2013 | Jain | G06F 17/30902 709/247 |
| 2014/0089452 | A1* | 3/2014 | Beck | H04N 21/8456 709/213 |

FOREIGN PATENT DOCUMENTS

| | | |
|---|---|---|
| CN | 101090306 A | 12/2007 |
| CN | 101192903 A | 6/2008 |
| CN | 101296166 A | 10/2008 |
| CN | 101502026 A | 8/2009 |
| CN | 101656877 A | 2/2010 |
| CN | 101848067 A | 9/2010 |
| CN | 102025983 A | 4/2011 |

OTHER PUBLICATIONS

International Search Report and Written Opinion received in International Application No. PCT/CN2013/072265 dated Aug. 1, 2013, 15 pages.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11)," 3GPP TS 26.247, V11.0.0, Sep. 2012, pp. 1-112.
Sullivan, G.J., et al., "Video Compression—From Concepts to the H.264/AVC Standard," Invited Paper, 18 Proceedings of the IEEE, vol. 93, No. 1, Jan. 2005, pp. 1-14.
Postel, J., "User Datagram Protocol," RFC 768, Aug. 28, 1980, pp. 1-3.
"Transmission Control Protocol," DARPA Internet Program Protocol Specification, RFC: 793, Sep. 1981, 91 pages.
Adzic, V. et al., "Optimizing Video Encoding for Adaptive Streaming over HTTP," IEEE Transactions on Consumer Electronics, vol. 58, No. 2, May 2012, pp. 397-403.
Schwarz, H., et al., "Overview of the Scalable Video Coding Extension of the H.264/AVC Standard," IEEE Transactions on Circuits and Systems for Video Technology, vol. 17, No. 9, Sep. 2007, pp. 1103-1120.
Fielding, R., et al., "Hypertext Transfer Protocol—HTTP/1.1," Network Working Group, Jun. 1999, pp. 1-176.
Schulzrinne, H., et al., "RTP: A Transport Protocol for Real-Time Applications," Network Working Group, Jul. 2003, pp. 1-89.

\* cited by examiner

SYSTEMS AND METHODS FOR DATA REPRESENTATION AND TRANSPORTATION

TECHNICAL FIELD

The present invention relates to the field of data transmissions, and, in particular embodiments, to systems and methods for content representation and transportation over the Internet or other networks.

BACKGROUND

Media streaming services, e.g., movies or music streaming services, are provided as over-the-top (OTT) content by media service providers (e.g., Netflix). The content is streamed from the providers' servers to end users through the Internet and/or one or more other networks. OTT content is typically delivered over the Internet without the Internet service provider's involvement in the control or distribution of the content itself. For example, media services are also provided to mobile devices via wireless core networks. The media transmission is controlled by networking protocols and technologies, such as Dynamic Adaptive Streaming over Hypertext Transfer Protocol (DASH). The DASH protocol provides multiple representations of the same media, e.g., with different data rates, to support varying network transmission bandwidth. Lower data rate representations have lower video quality, while transmitting higher data rate media with insufficient bandwidth can cause delays or interruptions in streamed media, which affects user quality of experience (QoE). Improving media representation to meet bandwidth and QoE requirements is desired.

SUMMARY

In one embodiment, a method for providing data content includes encoding a plurality of compressed data portions using a plurality of data portions for a data content, wherein the compressed data portions correspond to a subset of the data portions, comprise less redundant data than the subset of data portions, and are encoded in accordance with data in the remaining data portions, and transmitting the compressed data portions instead of the subset of data portions with the remaining data portions according to a sequence of data portions.

In another embodiment, a network component for providing data content includes a processor and a computer readable storage medium storing programming for execution by the processor, the programming including instructions to encode a plurality of compressed data portions using a plurality of data portions for a data content, wherein the compressed data portions correspond to a subset of the data portions, comprise less redundant data than the subset of data portions, and are encoded based on data in the remaining data portions, and transmit the compressed data portions instead of the subset of data portions with the remaining regular segments according to a sequence of data portions.

In another embodiment, a method for obtaining data content includes sending a request to download a data content and receiving a plurality of data portions and compressed data portions in a sequence of data portions, wherein the compressed data portions are encoded by removing redundant data included in the data portions.

In another embodiment, a network component for obtaining content data includes a processor and a computer readable storage medium storing programming for execution by the processor, the programming including instructions to send a request to download content data; and receive a plurality of data portions and compressed data portions in a sequence of data portions, wherein the compressed data portions are encoded by removing redundant data included in the data portions.

In another embodiment, a radio access node for transporting data content includes a processor and a computer readable storage medium storing programming for execution by the processor, the programming including instructions to receive a User Datagram Protocol (UDP) packet sent form a server and comprising a compressed data portion in a sequence of data portions, wherein the compressed data portion is encoded by removing redundant information included in the other data portions, forward the UDP packet to a client, and send an acknowledgement (ACK) message to the server upon successfully forwarding the UDP packet to the client.

In another embodiment, a radio access node for transporting data content includes a processor and a computer readable storage medium storing programming for execution by the processor, the programming including instructions to receive a plurality of compressed data portions for data content sent form a server in response to forwarding a plurality of ACK messages from a client, convert the compressed data portions into a plurality of corresponding data portions supported by a media player at the client, and transmit the corresponding data portions to the client, wherein the compressed data portions have less redundant data than the corresponding data portions and are encoded based on information in other transmitted data portions.

In yet another embodiment, a radio access node for transporting data content includes a processor and a computer readable storage medium storing programming for execution by the processor, the programming including instructions to receive a plurality of data portions in a sequence of data portions for data content sent form a server in response to forwarding a plurality of ACK messages from a client, convert the data portions into a plurality of corresponding compressed data portions, and transmit the corresponding compressed data portions to the client, wherein the compressed data portions have less redundant data than the corresponding data portions and are encoded based on information in other transmitted data portions.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods that provide new data representation to improve transmission efficiency of content services (e.g., OTT content) or data in general and user quality of experience (QoE). The transmission efficiency and user QoE are improved by reducing the redundancy in the representation of content or data transmitted over one or more networks (e.g., the Internet and a mobile core network). The redundancy is reduced in the data representation without substantially reducing the content (e.g., video) quality or data integrity. For instance, data can be represented as one or a plurality of data portions that are transmitted separately (and consecutively) over the one or more networks. The redundancy in at least some of the data portions is reduced to improve transmission efficiency and QoE.

The systems and methods can be applied for different types of data or content traffic, like video streaming, audio streaming, web browsing, file downloading, and network transport protocols, including DASH and other protocols. The embodiments below are related to media services (e.g., video/audio streaming), where media representation is represented using a plurality of media segments that form a content (e.g., a video). However, the embodiments, systems, and methods herein can be extended and applied for any type of data or content representation to improve transmission efficiency (e.g., reduce bit rate or transmission bandwidth) and QoE (e.g., reduce delays or interruptions in service or download).

Figure 1:
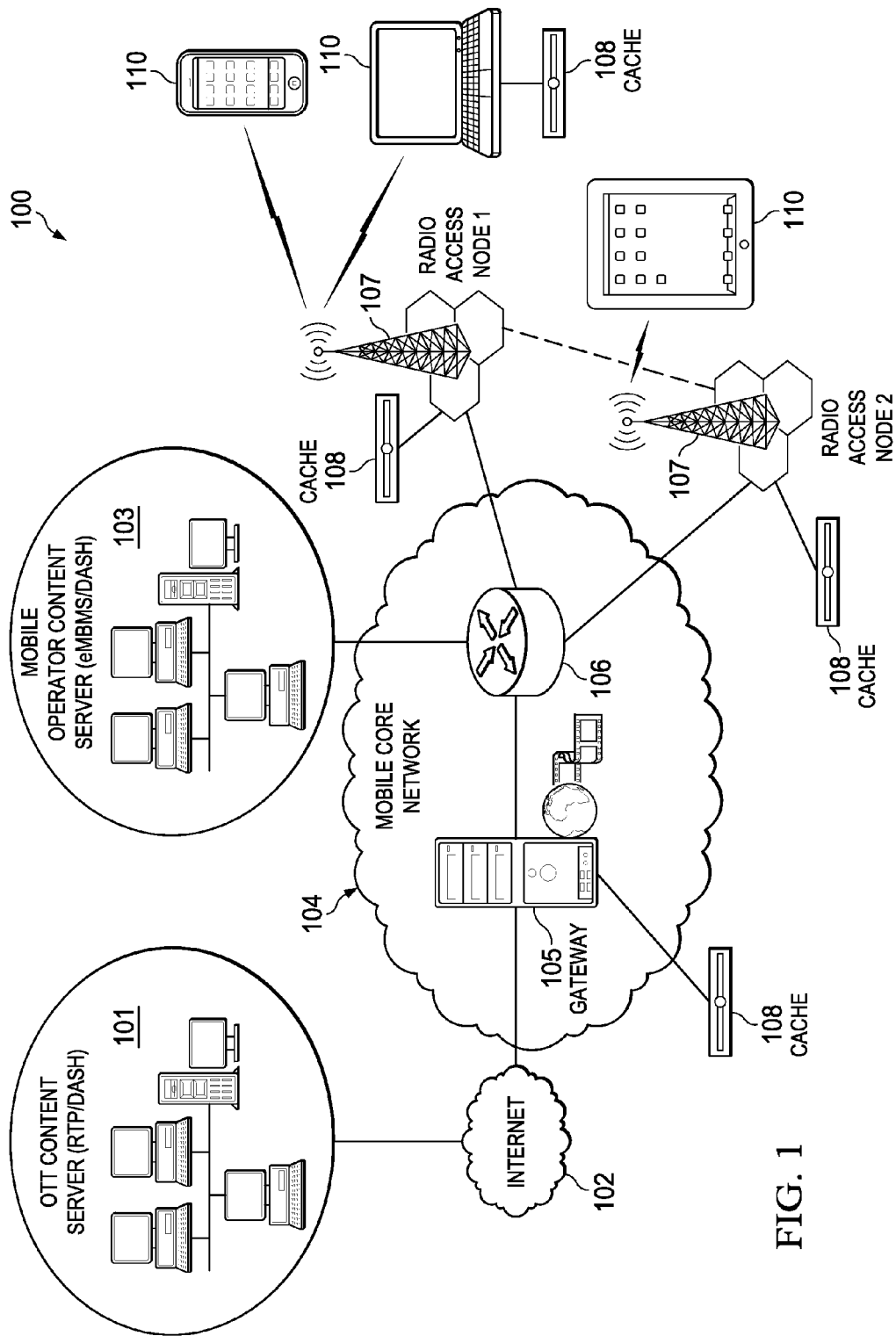
FIG. 1 illustrates an example content distribution system.

FIG. 1 illustrates an example content distribution system 100 that comprises one or more networks. The system 100 comprises one or more OTT content servers 101 coupled to the Internet 102, one or more mobile operator content servers 103 coupled to a mobile (or wireless) core network 104, and one or more user equipments (UEs) 110. The OTT content server 101 is configured to transmit media services (e.g., video and/or music services) using Real-Time Protocol (RTP) and DASH. The media content is transmitted via the Internet 102 and the mobile core network 104 to the UEs 110. The mobile operator content server 103 is configured to transmit media services using enhanced Multimedia Broadcast Multicast Service (eMBMS) and DASH to the UEs 110 via the mobile core network 104. In other embodiments, other technologies and protocols can be used to transmit the media content to the users.

The content can be transported between the Internet 102 and the mobile core network 104 via a gateway 105, e.g., at the edge of the mobile core network 104. The content is forwarded through the mobile core network 104 via one or more routers 106, which are coupled to the mobile operator content server 103 and the gateway 105. The routers 106 are also coupled to one or more radio access nodes 107, also referred to as base stations or cell towers, e.g., at the edge of the mobile core network 104. The radio access nodes 107 communicate with the UEs 110 to forward the media content to the UEs 110. Additionally, at least some of the content forwarded through the mobile core network 104 is cached in one or more cache units 108, e.g., at the gateway 105 and/or any of the radio access nodes 107.

Figure 2:
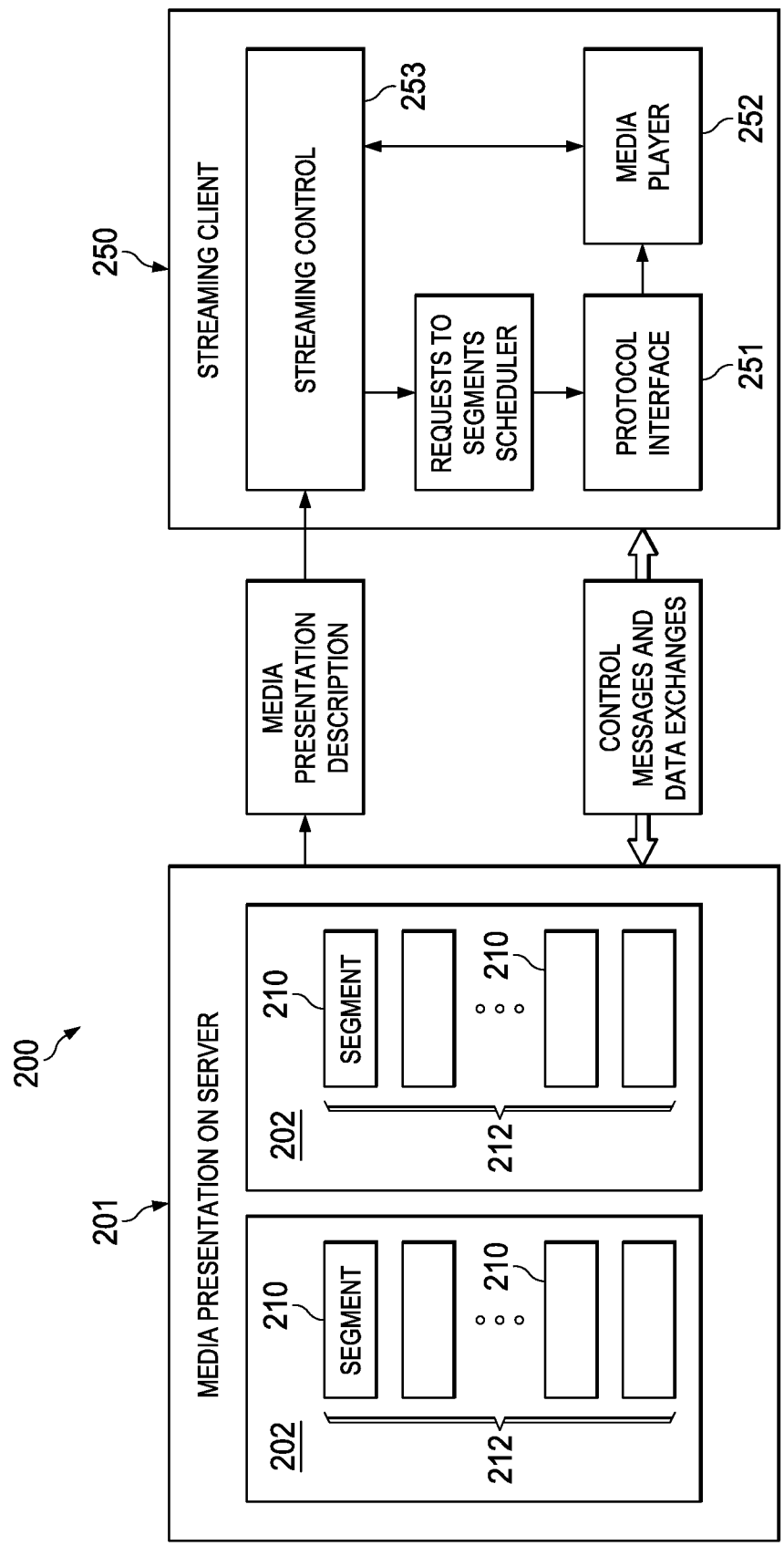
FIG. 2 is a block diagram of a typical client-server model according to DASH.

FIG. 2 illustrates a typical client-server model 200 according to DASH, which can be implemented in the system 100. A server 201 (e.g., an HTTP server) comprises a plurality of media files 210, for example in one or more memory units or queues 202. Each media file 210 is divided into a plurality of shorter segments 212, which can be transferred through the network in few seconds, for example. Each media segment 212 may have multiple representations encoded with different bit rates. The segments 212 are transferred from the server 201 to a client 250 (e.g., a HTTP streaming client) using any appropriate protocol, such as Hypertext Transfer Protocol (HTTP), over the network. The client 250 is located at a UE, for example. The client 250 comprises a protocol interface 251 (e.g., a HTTP access client) that receives the segments 212, a streaming control unit 253 (e.g., a HTTP streaming control) that receives media representation description from the server 201 and sends requests for segments (e.g., via a scheduler) to the protocol interface 251. The segments are then forwarded to a media player 252 at the client 250 to decode the segments and play the media content.

The client 250 sends a GET command to the server 201 to download media segments 212. Because the channel bandwidth may change from time to time, the client 250 may request different media representations at different rates, such that the media bit rate is not higher than the supported or available network bandwidth. The media segments 212 are exchanged between the server 201 and the client 250, for instance using a Transport Control Protocol (TCP). The TCP allows the client 250 to send, after receiving a segment 212, an acknowledge (ACK) message back to the server 201 so that the server 201 knows whether the media segment 212 was successfully received and decoded by the client 250.

Figure 3:
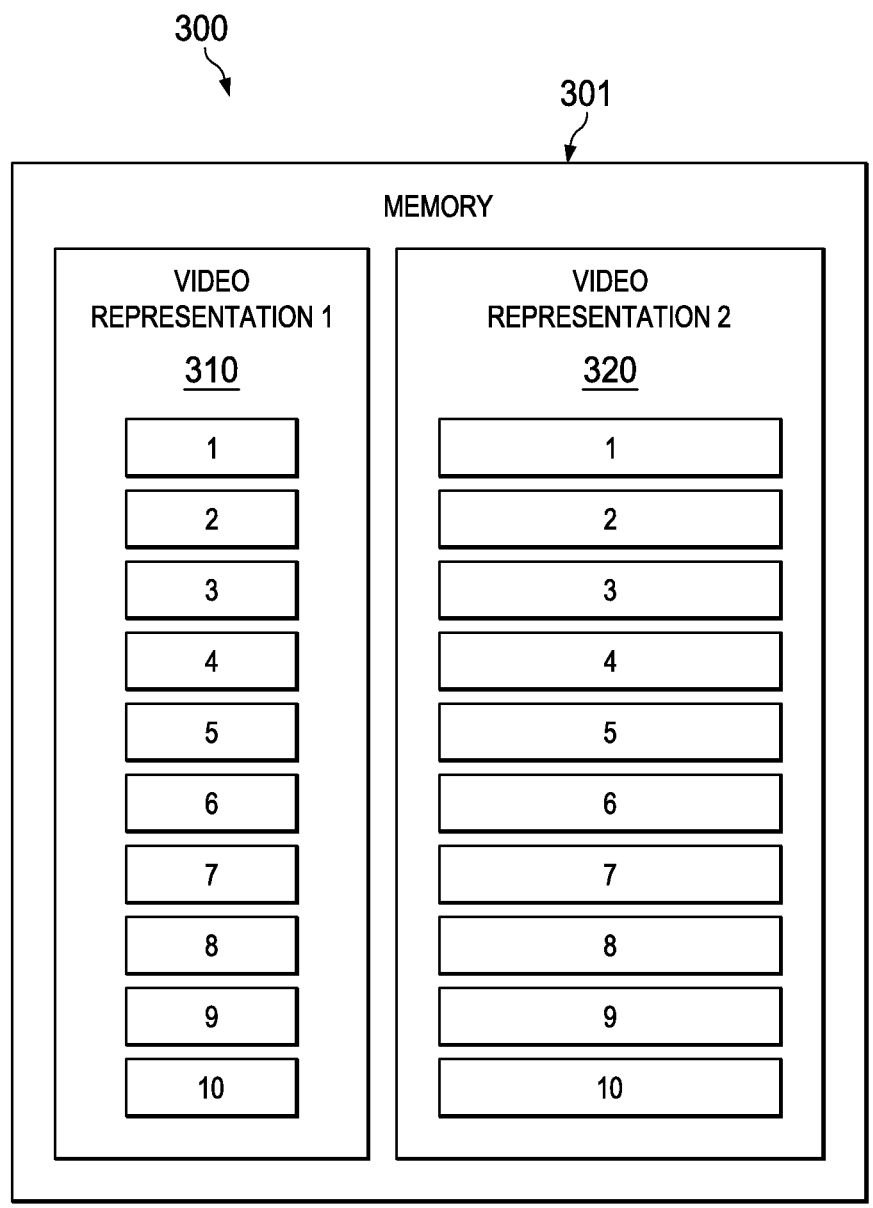
FIG. 3 is a block diagram of a typical media representation.

FIG. 3 illustrates a typical media representation 300 that can be used in the typical client-server model 200 according to DASH. A media content, such as video content, can be stored in a memory 301 (e.g., at a content or media server) in multiple versions as different video representations encoded with different bit rates. For instance, the memory 301 includes a first video representation 310 with a low bit rate and a second video representation 320 for the same content with a high bit rate. Each video representation is saved as a combination of a plurality of segments (e.g., 10 segments) that can be transmitted and hence received separately and consecutively. Each segment comprises one or more group of pictures (GoPs). Typically, a media segment is about 2 to 10 seconds long and comprises one GoP. A client software uses a GET command (in HTTP) to download the segments from the memory 301. In the case of a high capacity channel (with relatively high bandwidth), the client requests the second video representation 320 encoded with the high bit rate. In the case of a low capacity channel (with relatively low bandwidth), the client requests the first video representation 310 encoded with the low bit rate.

Although DASH offers many advantages, the redundancy is one of the issues that can reduce transmission efficiency of media services and/or reduce user QoS, e.g., when link bandwidth is limited. At least some of the segments or GoPs are independently encoded, which allows refreshing media quality and fast switching between encoded media streams. Encoding the media segments independently at the server allows decoding the segments independently at the client. However, this requires introducing data redundancy in the different segments. In some scenarios, e.g., to support Scalable Video Coding (SVC), some segments may be dependent on other segments for decoding. For example, one segment comprises base layer of media, while other segments comprise enhanced layers. However, the segments of the same media layer are still independently encoded. The information redundancy between two subsequent (or consecutive) media segments can be significant because GoPs between subsequent segments may be substantially correlated as they are in the same scene. This causes a waste of bandwidth to deliver independently encoded GoPs/segments.

To improve media coding efficiency, the size of GoPs in segments may be increased (e.g., more pictures are grouped in a segment). However, increasing the size of GoPs increases the size of files in one video segment for transfer, which presents challenges in transmission (this is the reason a media file is divided into smaller segments or files for transfer). Further, if a user stops watching, the remaining downloaded media bits in larger transferred files are wasted.

Figure 4:
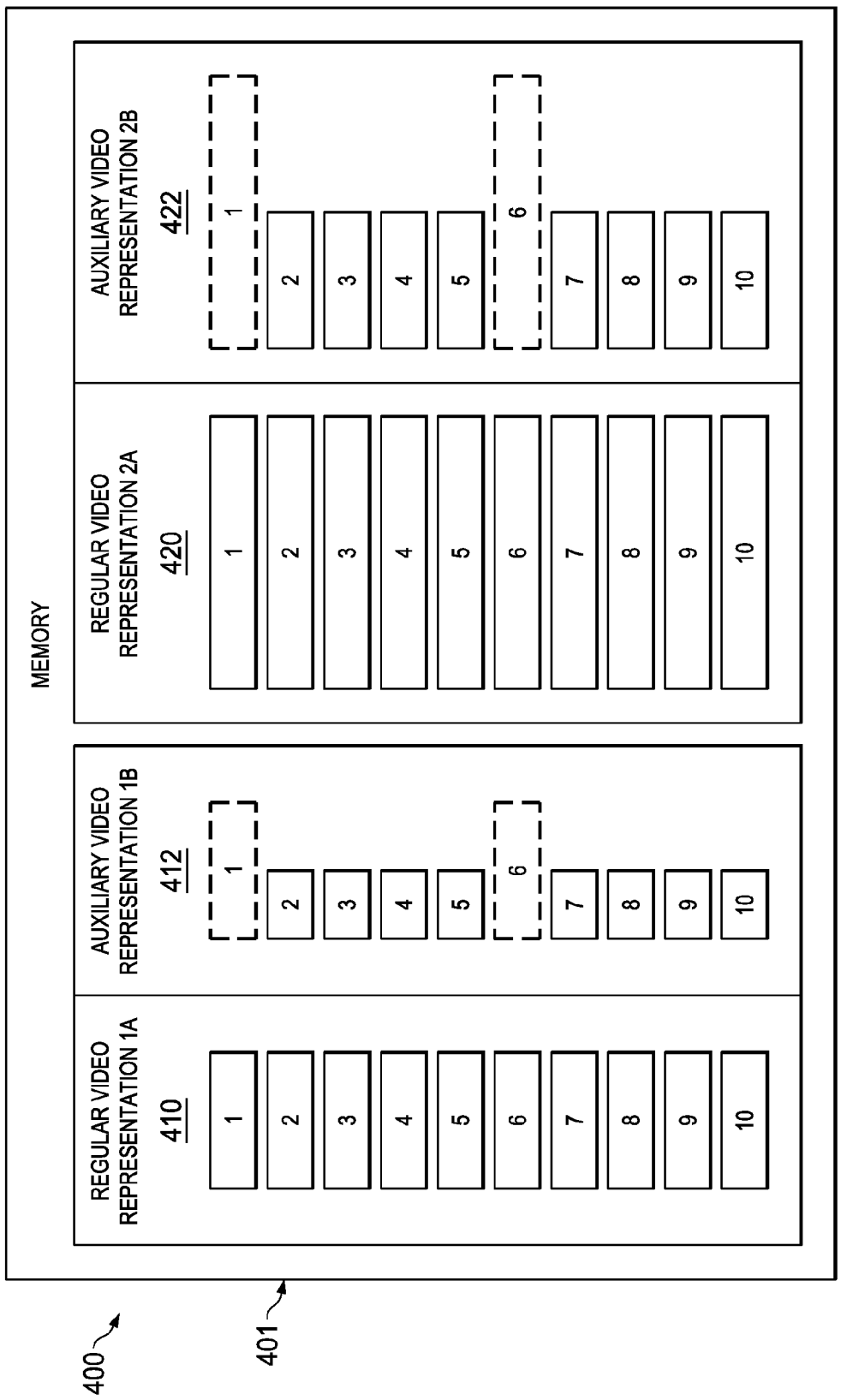
FIG. 4 is a block diagram of an embodiment media representation with reduced redundancy.

FIG. 4 illustrates an embodiment media representation 400 with reduced redundancy. The media representation 400 is based on reducing or removing information redundancy between segments, e.g., subsequent video segments. This reduces the bandwidth requirement for video transmission, i.e., improves transmission efficiency, and further improves user QoE. A media content (e.g., video content) can be stored in a memory 401 (e.g., at a content server) with different bit rates, for instance a first video representation 410 with a low bit rate and a second video representation 420 with a high bit rate. Each of the video representations 410 and 420 is divided into a plurality of segments (e.g., 10 segments) that can be transmitted and hence received separately.

Additionally, an auxiliary media representation is encoded and stored for each of the video representations 410 and 420. This includes a first auxiliary video representation 412 associated with the first video representation 410, and a second auxiliary video representation 422 associated with the second video representation 420. The auxiliary video representations 412 and 422 can be stored with the corresponding video representations 412 and 422 in the same memory 401. Each of the auxiliary video representations 412 and 422 is also divided into an equal number of segments (e.g., 10 segments) that can be transmitted and hence received separately.

Some of the segments of the auxiliary video representation 412, for example segments 1 and 6, are identical to their corresponding segments of the first video representation 410, respectively. The remaining segments of the auxiliary video representation 412 are compressed versions of their corresponding segments in the first video representation 410. Similarly, the segments 1 and 6 of the auxiliary video representations 422 are identical to their corresponding segments of the video representation 420 and the remaining segments of the auxiliary video representation 422 are compressed versions of their corresponding segments in the video representation 420. The segments in the auxiliary video representations 412 and 422, also referred to herein as auxiliary segments, are created by removing redundant data in their corresponding regular segments in the video representations 410 and 420, as described below. The compressed auxiliary segments may have lower bit rates than their respective regular segments.

In the auxiliary video representations 412 and 422, the compressed auxiliary segments are dependent on the full size segments 1 and 6. For example, segment 2 is dependent on segment 1. This means that segment 2 is decoded at a receiver or client using some of the information in segment 1. Thus, segment 2 can be decoded only if segment 1 is received and decoded successfully. Similarly, each of segments 3, 4, and 5 are dependent on segment 1. In another embodiment, at least some subsequent auxiliary segments are also dependent on each other. This further removes data redundancy in the auxiliary segments. For example, segment 3 may be dependent on segment 2, which in turn is dependent on segment 1. Thus, segment 3 is dependent on both segments 1 and 2. This means that segment 3 can be decoded only if both segments 1 and 2 are received and decoded successfully.

The auxiliary segments may be generated in any of the schemes below. For example, segments 1 and 2 comprise dependent GoPs, where segment 1 includes an I picture frame (I-frame) and where other picture frames of segments 1 and 2 are encoded based on this I-frame. To further remove data redundancy and achieve bandwidth saving, the I-frame in segment 2 is replaced by a more coding efficient picture frame, e.g., a P-frame or a B-frame. This scheme is referred to herein as inter-segment encoding. To save storage space, the auxiliary video segments can be created on-the-fly by a transcoding unit, for example the video key frames (e.g., I or IDR frames in H.264 standard) can be transcoded on-the-fly.

In another example, segments 1 and 2 comprise independent GoPs, where media compression is applied independently to the GoPs in the two segments. The encoded media bits of the GoPs in the two segments are then compressed by the same bit or symbol compression software program such that the decompression can be achieved on-the-fly (while the streamed segments are being received at the client). This ensures that segment 1 is independently decoded, and segment 2 that is dependent on segment 1 is subsequently decoded based on segment 1. In this case, data redundancy removal and bandwidth saving is obtained by symbol-level or bit-level compression, which is applied jointly to the two segments. This scheme is referred to herein as inter-segment compression.

In yet another example, a combination of both schemes above can be used to generate two dependent segments 1 and 2, where the dependency is achieved from both inter-segment encoding and inter-segment compression. In any of the schemes above, the media compression can be made on-the-fly (while the segments are being streamed at the server). For instance, once a media segment n is successfully received, the n+1 media segment (subsequent segment) could be compressed with reference to media segment n.

The compressed and dependent auxiliary segments can be transmitted instead of their corresponding regular segments to save bandwidth or in case of bandwidth reduction on the link. For example, when a user watches a streamed video, the segments of the corresponding media are transmitted form server to client. The client device (UE) sends ACK messages (using TCP) when the segments are received and decoded successfully. In return to receiving each ACK message, the server transmits a subsequent or next auxiliary segment that succeeds in the sequence of segments the last transmitted segment associated with the ACK message. The subsequent or next auxiliary segment may be dependent on the last previously sent and successfully received and decoded segment. If the server does not receive an ACK message after sending a segment, then the server sends a subsequent regular segment instead of the next auxiliary segment.

Figure 5:
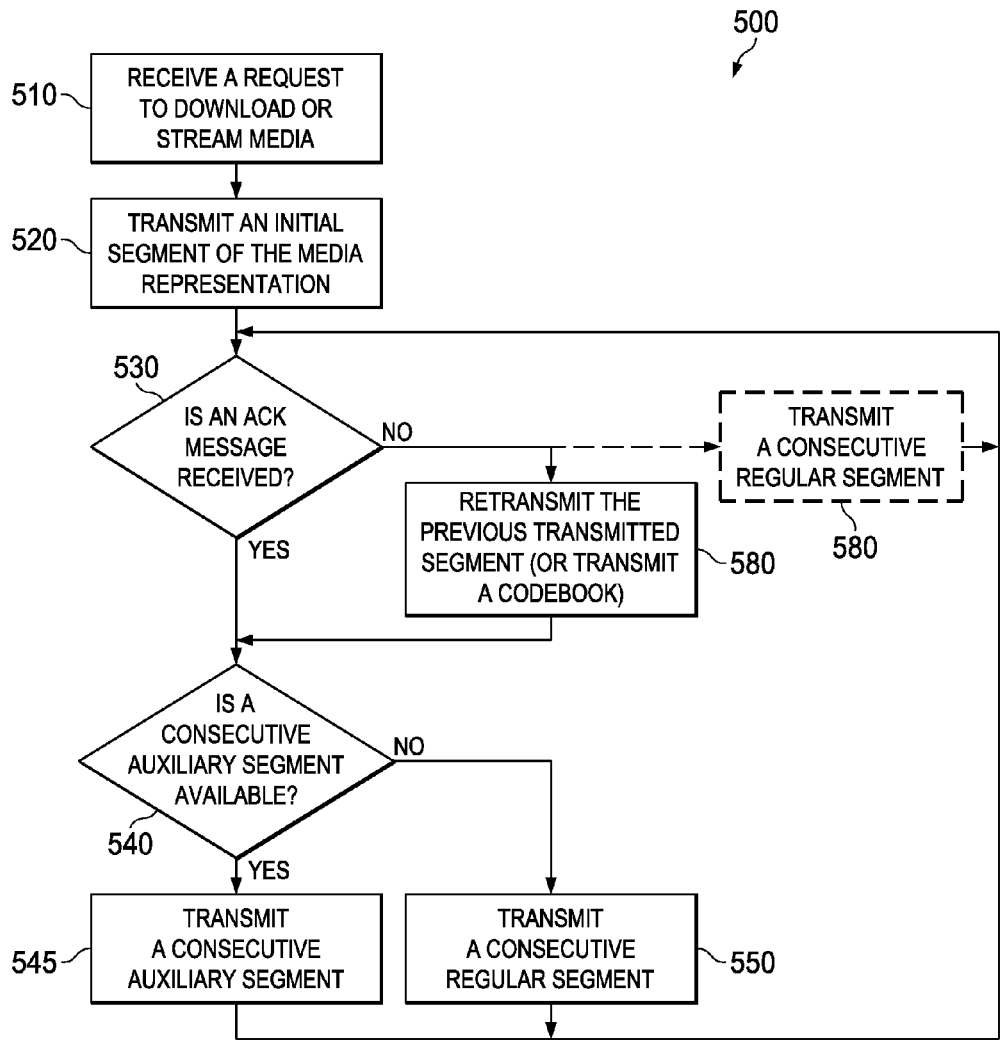
FIG. 5 is a flowchart of an embodiment method for transmitting media with reduced redundancy.

FIG. 5 illustrates an embodiment method 500 for transmitting media with reduced redundancy. For instance, the method 500 is implemented in the content distribution system 100 to transmit or stream media from a server to a client (a UE). Specifically, the method 500 uses the media representation 400 that includes compressed/dependent auxiliary segments (e.g., for multiple media representations with different bit rates). The steps below of the method 500 may be implemented in the order described below or in any other appropriate order. At step 510, a request to download or stream media is received. For example, the mobile operator content servers 103 or the OTT content servers 101 receives a request from a UE 110 to download media.

At step 520, an initial segment of the media representation is transmitted. The initial segment belongs to a media representation with a data rate that is determined by the request from the client or according to available link bandwidth. The initial segment is a regular segment, such as segment 1 of the high bit rate video representation 420. At decision block 530, the method 500 determines whether an ACK message is received. The ACK message is returned from the client upon receiving and decoding segment 1 successfully, according to TCP. If the ACK message is received, then the method 500 proceeds to decision step 540. Otherwise, the method 500 proceeds to step 580.

At decision step 540, the method 500 determines whether a subsequent (or consecutive) auxiliary segment is available, such as segment 2 in the media representation 400. If the condition in step 540 is true, then the method 500 proceeds to step 545. Otherwise, the method 500 proceeds to step 550. At step 545, a subsequent auxiliary segment is transmitted. The auxiliary segment is dependent on the previous transmitted segment, where redundancy between the two segments is removed. The auxiliary segment is then received by the client and decoded using information from the previous decoded segment. For example, the compressed auxiliary segment 2 of the high bit rate video representation 422, which depends on information in segment 1 for encoding, is transmitted. Alternatively at step 550, a subsequent regular segment is transmitted. The regular segment may comprise redundant information with the previous transmitted segment and can be decoded at the client independent from the previous segment. For example, the regular segment 2 of the high bit rate video representation 420, which can be decoded at the client independent from segment 1 due to redundant data in both segments, is transmitted. After implementing step 545 or 550, the method 500 returns to decision block 530 to complete transmitting auxiliary or regular segments until all media segments are transmitted.

At step 580, the previous transmitted segment (e.g., a regular or auxiliary segment) is retransmitted. Alternatively, a codebook is transmitted. The codebook can be built on-the-fly and comprises codewords of the one or more lost or failed previous segments. The receiver at the client can use the retransmitted previous segment or the codebook to decode a subsequently transmitted auxiliary segment. After step 580, the method 500 proceeds to step 540. In another embodiment, the method 500 implements an alternative step 580, where a subsequent regular segment is transmitted. After alternative step 580, the method 500 returns to decision block 530 to complete transmitting auxiliary or regular segments until all media segments are transmitted.

Figure 6A:
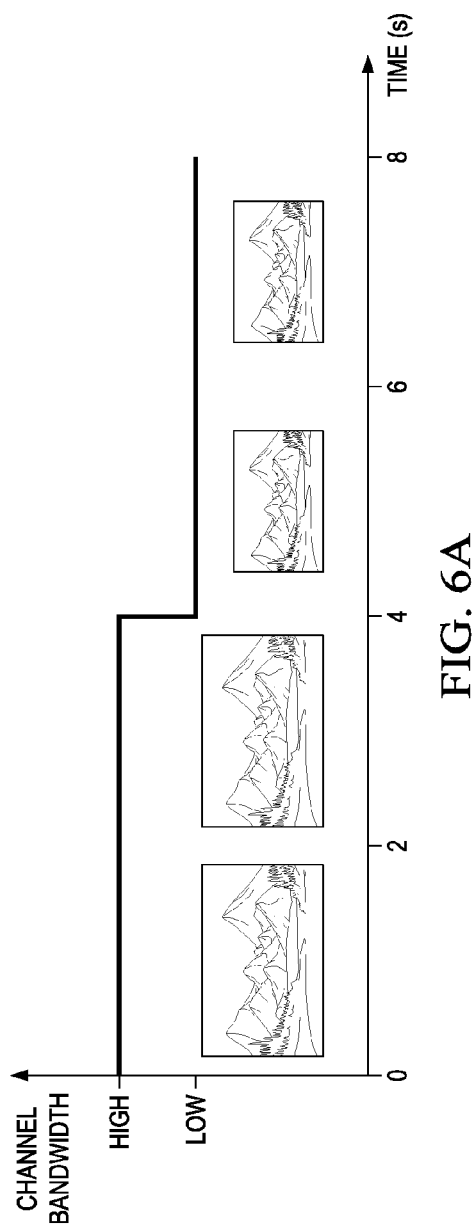
FIGS. 6A and 6B illustrate visual quality using typical media representations and improved media representations with reduced redundancy.
Figure 6B:
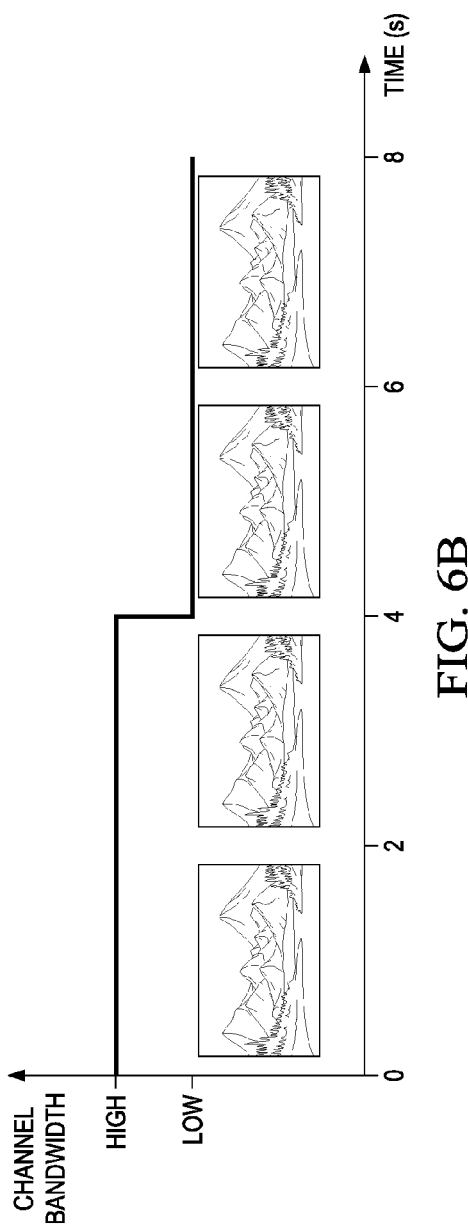

FIGS. 6A and 6B illustrate visual quality using typical media representations and improved media representations with reduced redundancy. FIG. 6A shows a sequence of streamed images or video frames over time versus transmission channel bandwidth using a typical media streaming scheme that adapts to bandwidth reduction. Accordingly, the segments of a high bit rate media representation are replaced by segments of a lower bit rate representation when channel bandwidth is reduced, which provides lower video quality (e.g., lower spatial resolution). In another scenario, the segments with lower bit rate comprise more coarse quantization of video information elements. For example, the typical scheme uses the typical media representation 300 with high and low bit rate representations.

FIG. 6B shows a sequence of streamed frames over time versus the channel bandwidth using a media representation with reduced redundancy in the media segments. Accordingly, the auxiliary segments of a high bit media representation are transmitted (if available and ACK messages are received) instead of the regular segments, which maintains about similar video quality (about the same spatial resolution). A negligible or relatively small drop in objective or subjective quality can occur due to removing redundancy information in the auxiliary segments. For example, the segments of the second auxiliary video representation 422 are transmitted using the method 500. When channel bandwidth is reduced, auxiliary segments with inter-segment compression (described above) can be transmitted to achieve more bandwidth savings. The auxiliary segments can meet the reduced channel bandwidth without substantially affecting video quality. Thus, spatial resolution and user QoE are improved in comparison to the scheme of FIG. 6A.

Figure 7A:
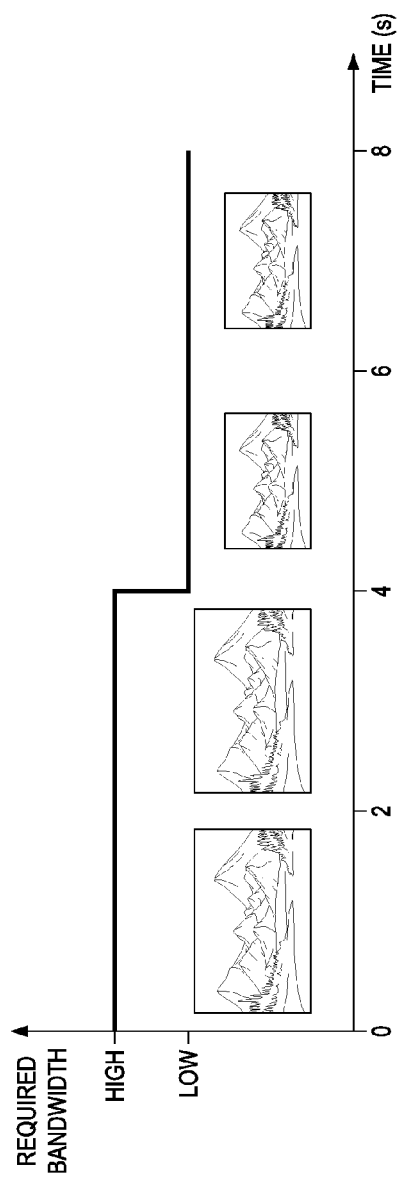
FIGS. 7A and 7B illustrate bandwidth saving using improved media representations with reduced redundancy in comparison to typical media representations.
Figure 7B:
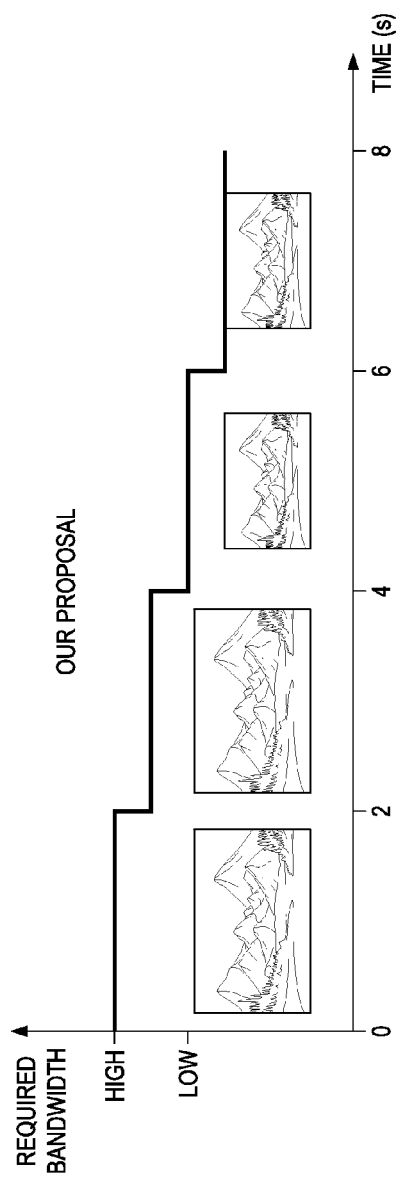

FIGS. 7A and 7B illustrate bandwidth saving using improved media representations with reduced redundancy in comparison to typical media representations. Similar to FIG. 6A, FIG. 7A shows a sequence of streamed images or video frames over time versus transmission channel bandwidth using a typical media streaming scheme that adapts to bandwidth reduction by transmitting segments with reduced bit rate.

FIG. 7B shows a sequence of streamed frames over time versus the channel bandwidth using a media representation with reduced redundancy in the media segments. Accordingly, the compressed auxiliary segments of a high bit media representation are transmitted (as described for FIG. 6B above) instead of the regular segments. When channel bandwidth is reduced, auxiliary segments with inter-segment compression, inter-segment encoding (described above), or a combination of both are transmitted to achieve varying levels of bandwidth savings. Subsequent segments with further increases in bandwidth savings can be transmitted. Thus, delays or interruptions in service can be avoided to provide better QoE. However, video quality or resolution can further decrease with further increases in bandwidth savings.

In an embodiment, the UE indicates to the media server a media encoding mode (for example the inter-segment encoding), a bit or symbol compression mode (e.g., inter-segment compression), or both via signaling. For example, a client software at the UE sends a message that indicates the media encoding mode and/or the bit or symbol compression mode to use for encoding and/or compressing the segments (statistically or on-the-fly) before sending the segments to the UE. The media encoding mode and/or the bit or symbol compression mode can be indicated in the request to download media or in a request to reduce transmission bandwidth.

Figure 8:
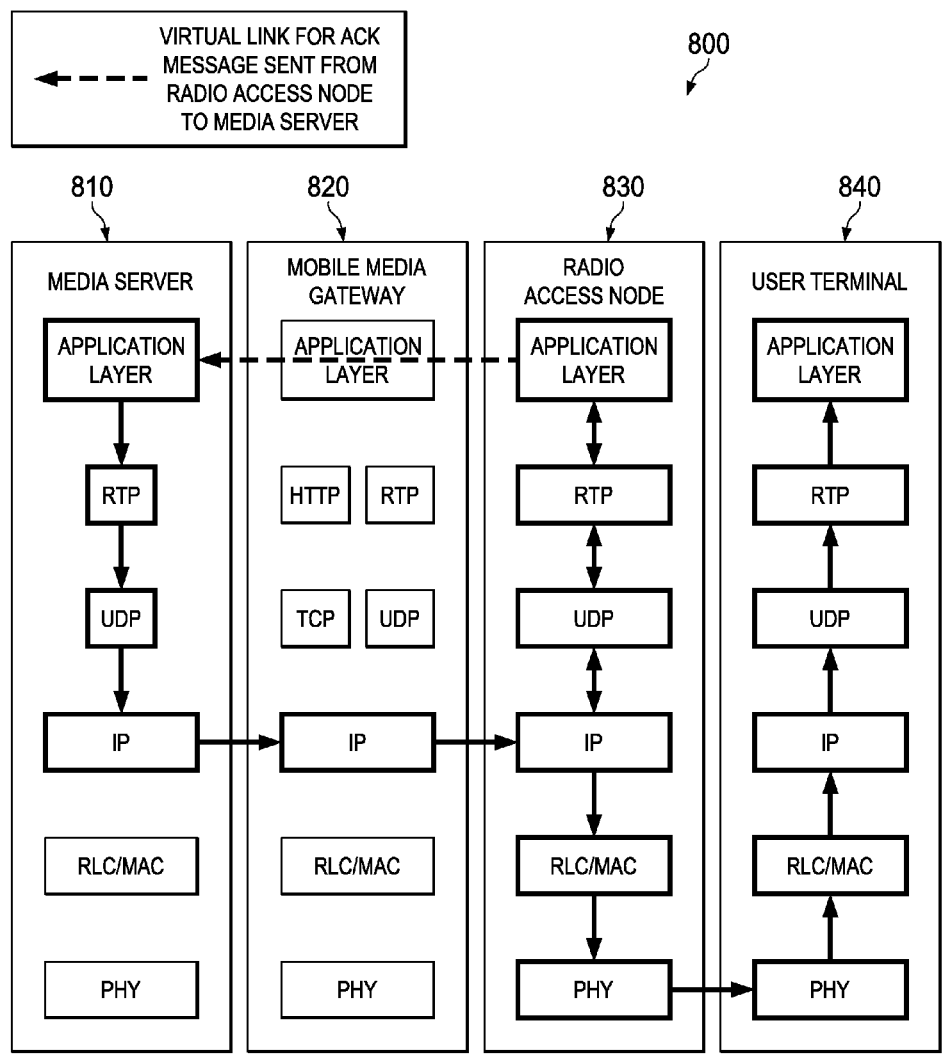
FIG. 8 is a block diagram of an embodiment system for sending acknowledgment (ACK) messages for User Datagram Protocol (UDP) packets.

FIG. 8 illustrates an embodiment system 800 for sending ACK messages for User Datagram Protocol (UDP) packets. Typically, if the media content is delivered using RTP and UDP, e.g., in IPTV standard, the ACK message is unavailable. Therefore, the server may not be able to determine whether to select the auxiliary segments instead of regular segments (as in method 500). To account for this, the system 800 is configured to exchange ACK messages between a media server 810 and a user terminal 840 (or UE) using UDP. The media server 810 and the user terminal 840 can communicate via a gateway 820 (e.g., mobile media gateway) and a radio access node (RAN) 830. The components of the system 800 comprise multiple layers for processing data, as shown in FIG. 8.

The RAN 830 is configured to process the UDP packets (exchanged between the media server 810 and the user terminal 840) to determine which media segments the packets belong to. For example, the RAN 830 comprises a function (software), a functional module (hardware), or a combination of both configured to access the UDP packets, e.g., at the IP layer. Thus, the RAN 830 is capable of determining if a segment is successfully transported (in the UDP packet) to the user terminal 840, e.g., as a physical layer message. Upon verifying that the segment is successfully transported to the user terminal 840, the RAN 830 sends an ACK message or a similar purpose message to the media server 810 (e.g., via the gateway 820) to notify the media server 810 of the successfully transfer of the segment (e.g., in a UDP packet) to the user terminal 840.

In an embodiment, when a segment (e.g., in a UDP or other protocol packet) is not successfully received and/or decoded by a client and the media server does not receive in return an ACK message, the media server resends the segment to allow the client to successfully decode or (or decompress) the segment. Alternatively, the server sends a codebook (e.g., on-the-fly) to the client to enable the client to successfully decode or decompress a new transmitted segment. The codebook comprises the codeword indices (of the segment) and their probabilities.

In another scenario, media segments of the same media content can be stored or distributed in multiple locations and components across the network, such as in a content distribution network (CDN). This allows users to download the same media content from different servers or caches. An original media server may comprise all the regular and corresponding auxiliary media segments or representations, while one or more caches across the CDN may only have the regular media representations, e.g., due to limited storage. In this case, if the download request from the client software is redirected to a cache, the cache is configured with transcoding and compression functions to create the auxiliary media segments or representations, e.g., statically or on-the-fly. The on-the-fly transcoding and compression is used to reduce the storage capacity requirement of the cache.

Figure 9:
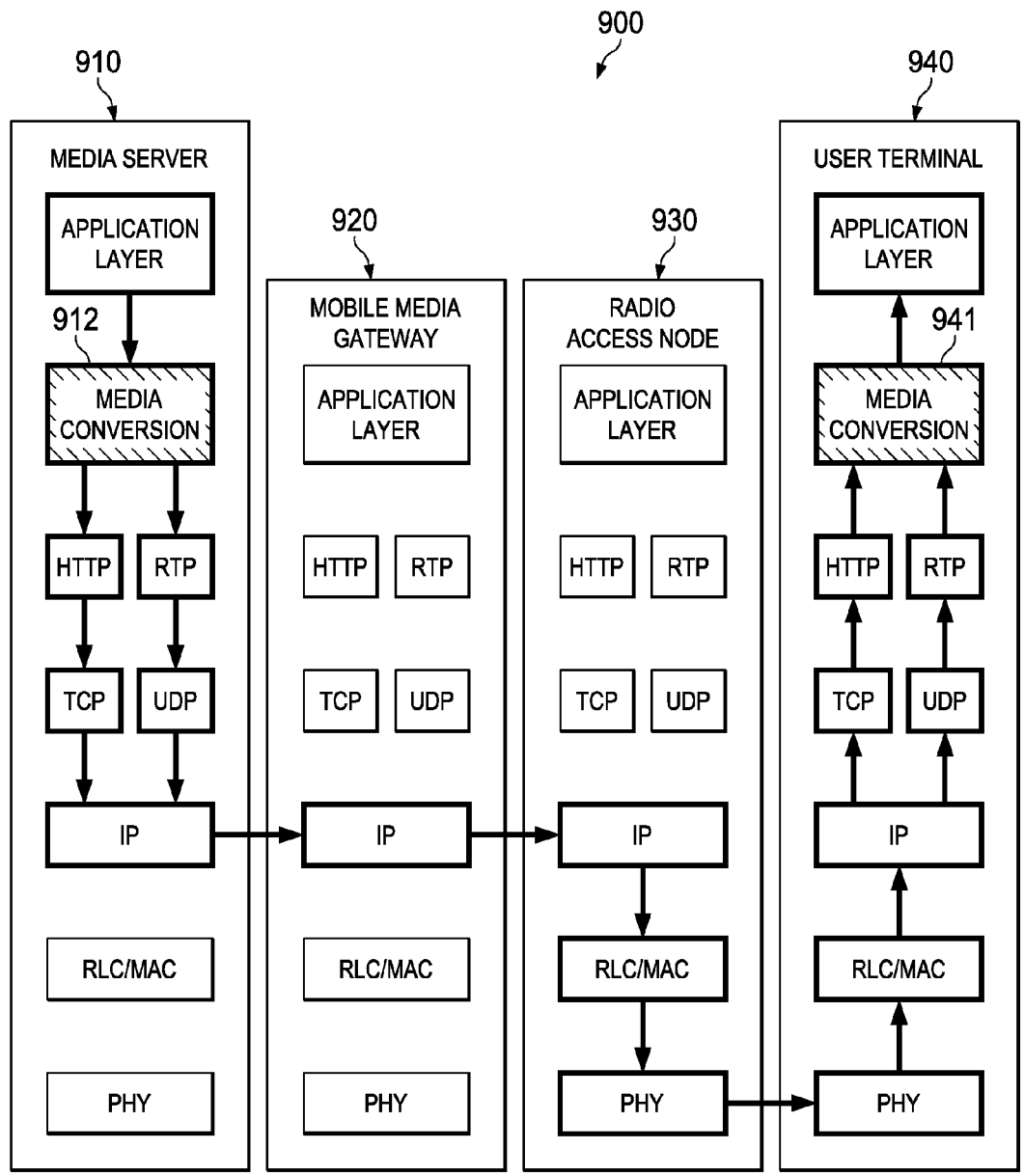
FIG. 9 is a block diagram of an embodiment system for supporting a legacy media player.

FIG. 9 illustrates an embodiment system 900 for supporting a legacy media player (or encoder/decoder) at a media server 910 and a user terminal 940. The legacy media player (or encoder/decoder) at an application layer of the media server 910 and similarly the user terminal 940 is not configured to generate, recognize, or process auxiliary media segments. To enable the transfer of auxiliary media segments between the media server 910 and the user terminal 940, e.g., via a gateway 920 and a RAN 930, a media conversion function can be added (via software and/or hardware) to each of the media server 910 and the user terminal 940. The media conversion function is configured to convert between segments supported by the legacy media (e.g., regular segments) into auxiliary segments on both ends to enable the transfer of auxiliary segments on the link (via the gateway 920 and the RAN 930) and thus achieve bandwidth saving.

The components of the system 900 comprise multiple layers for processing data, as shown in FIG. 9. Specifically, a first media conversion function 912 is added to the media server 910 between the application layer and the HTTP/RTP layers. The first media conversion function 912 converts segments (e.g., regular segments) supported by the legacy media player or encoder at the media server 910 into auxiliary segments that are then transmitted to the user terminal 940. A second media conversion function 941 is added to the user terminal 940 between the HTTP/RTP layers and the application layer. The second media conversion function 941 converts the auxiliary segments received from the media server 910 into segments (e.g., regular segments) supported by the legacy media player or decoder at the user terminal 940.

Figure 10:
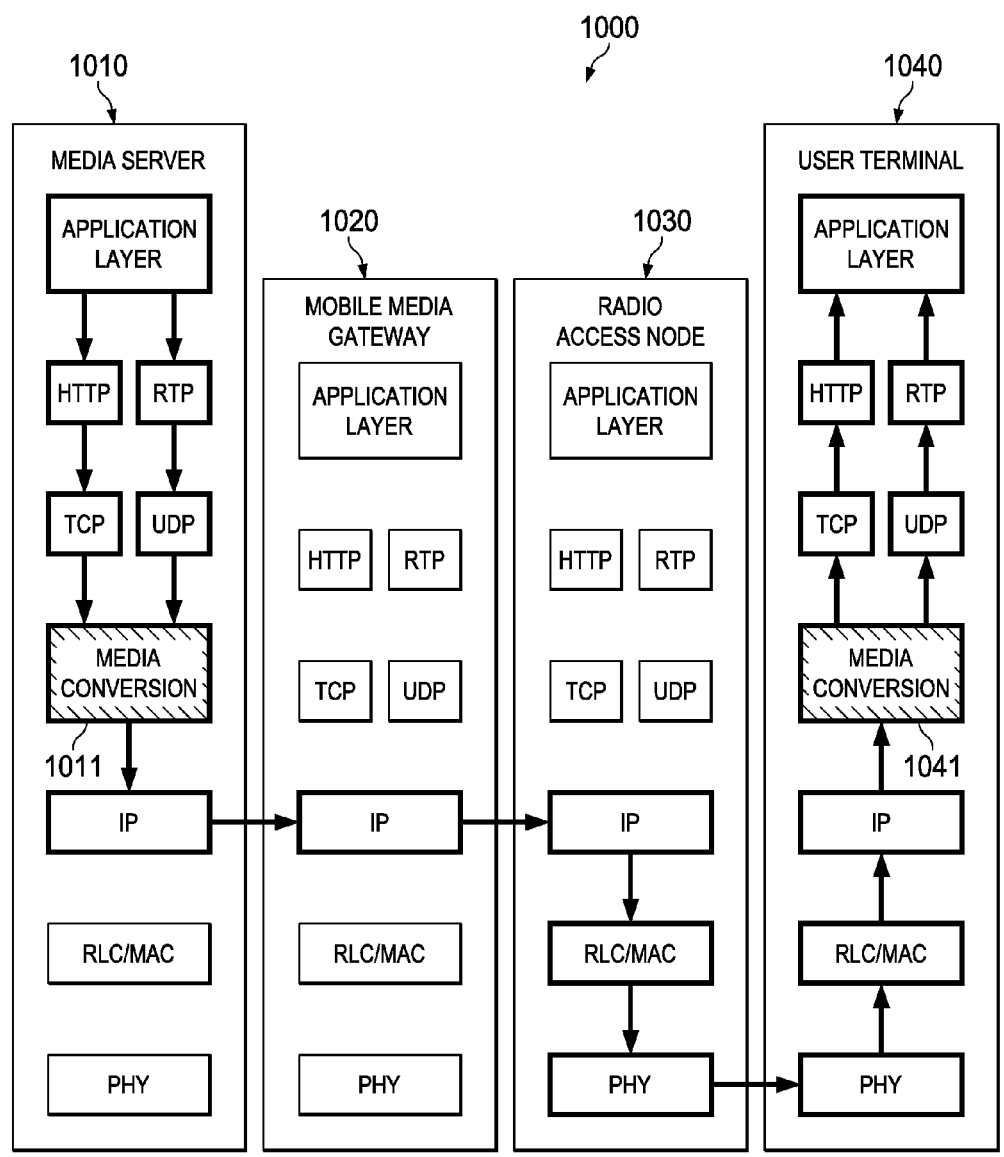
FIG. 10 is a block diagram of another embodiment system for supporting a legacy media player.

FIG. 10 illustrates another embodiment system 1000 for supporting a legacy media player at an application layer of a media server 1010 and similarly at a user terminal 1040 to enable the transfer of auxiliary media segments. The auxiliary segments are transferred via a gateway 1020 and a RAN 1030 between the media server 1010 and the user terminal 1040. The system 1000 comprises similar components as the system 900. However, a media conversion function is added on both ends of the system 1000 at a different layer than the system 900. Specifically, a first media conversion function 1011 is added to the media server 1010 between the TCP/UDP layers and the IP layer to convert segments (e.g., regular segments) supported by the legacy media player or encoder into auxiliary segments that are then transmitted to the user terminal 1040. A second media conversion function 1041 is added to the user terminal 1040 between the IP layer and the TCP/UDP layers to convert the auxiliary segments received from the media server 1010 into segments (e.g., regular segments) supported by the legacy media player or decoder at the user terminal 1040.

Figure 11:
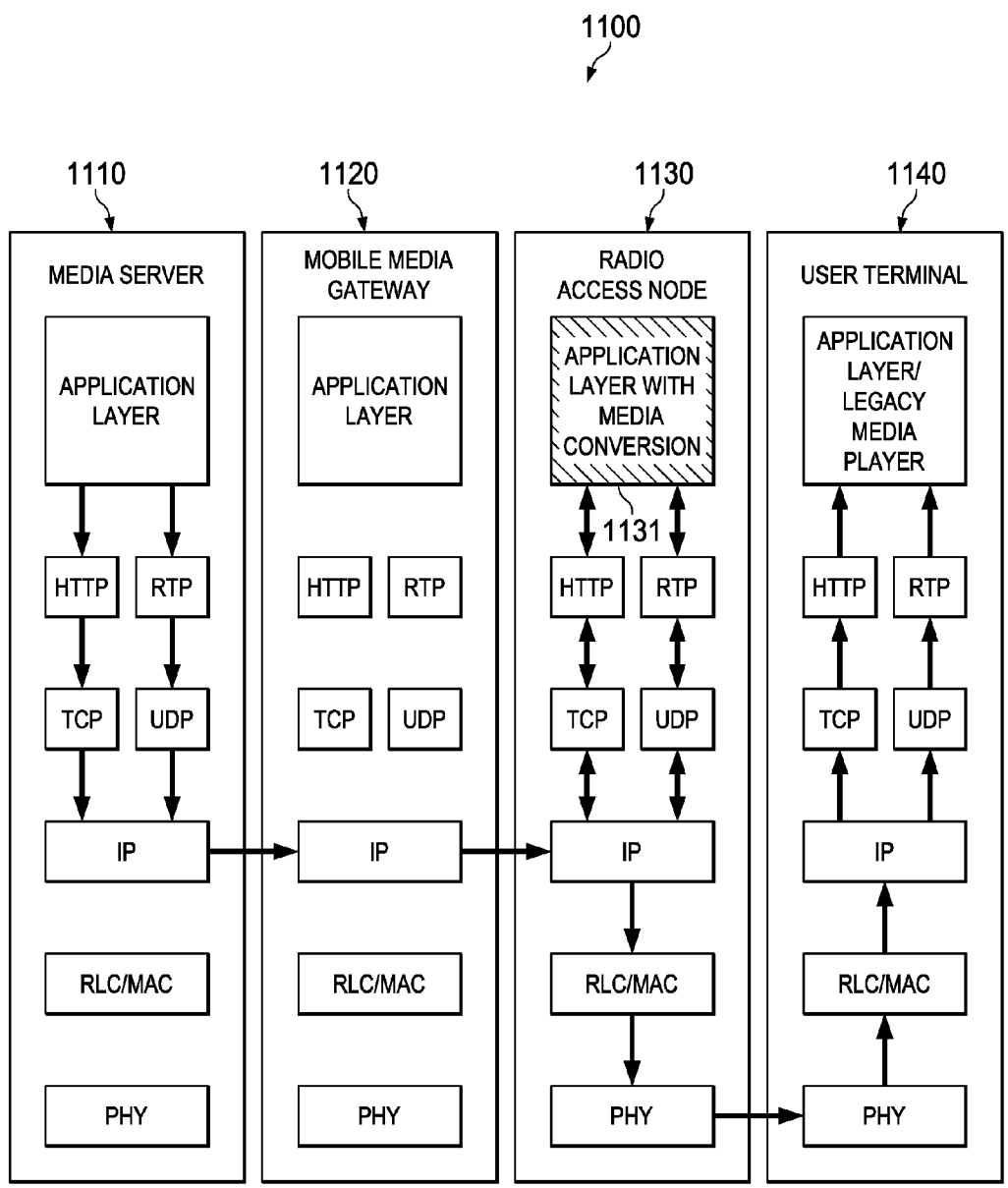
FIG. 11 is a block diagram of another embodiment system for supporting a legacy media player.

FIG. 11 illustrates yet another embodiment system 1100 for supporting a legacy media player at an application layer of a user terminal 1140 to enable the transfer of auxiliary media segments generated and sent from a media server 1110. The segments are transferred via a gateway 1120 and a RAN 1130 between the media server 1110 and the user terminal 1140. The system 1100 comprises similar components as the systems 900 and 1000. However, a media conversion function 1131 is added to the RAN 1130 instead of the media server 1110 and the user terminal 1140. The media conversion function 1131 is added to an application layer above the HTTP/RTP layers of the RAN 1130. The media conversion function 1131 is configured to convert auxiliary segments sent from the media server 1110 into segments (e.g., regular segments) supported by the legacy media player or decoder at the application layer of the user terminal 1140. After conversion, the RAN 1130 sends the segments to the user terminal 1140. In this case, bandwidth saving is achieved between the media server 1110 and the RAN 1130.

In another scenario, auxiliary media segments or representations may not be added at the media server, such as due to memory or software limitations. In this case, a new module can be added at the RAN (between the media server and the user terminal) to perform transcoding and compression functions. The new module intercepts all the media packets or segments sent from the media server to the user terminal, store the regular media segments, create corresponding auxiliary media segments, and forward the auxiliary media segments to the user terminal. Depending on the latest wireless channel and air interface loading conditions, the RAN can select a suitable media representation to send to the user terminal.

Figure 12:
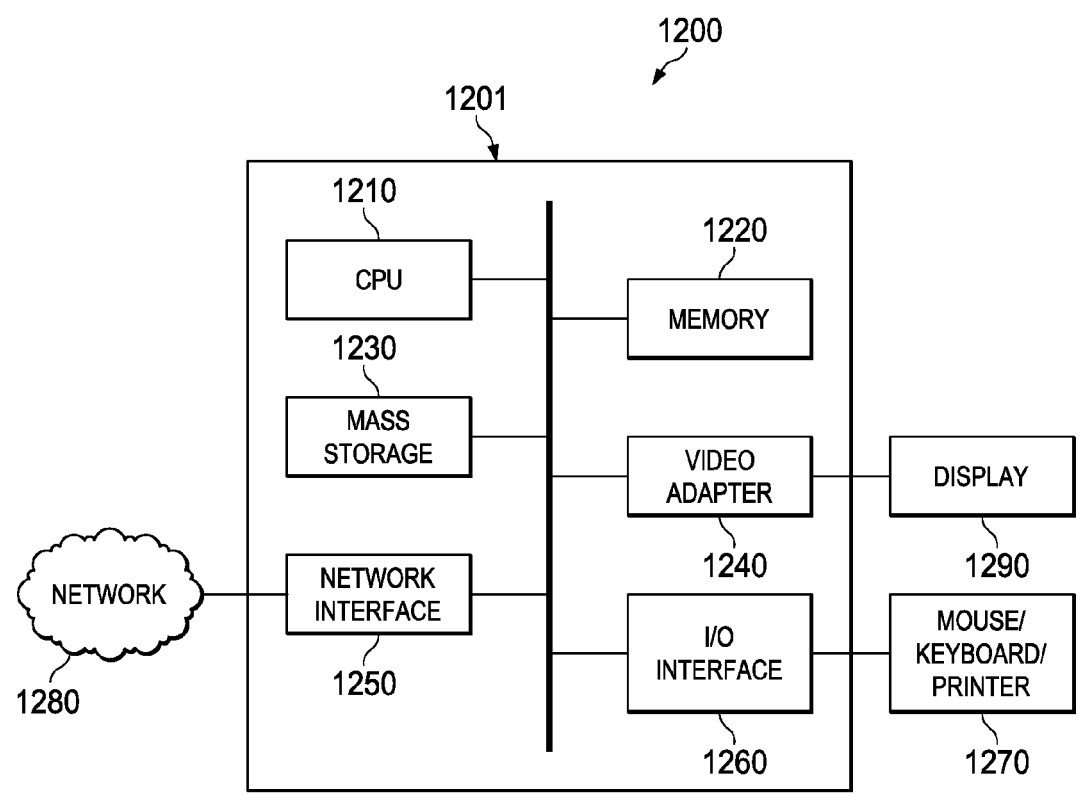
FIG. 12 is a block diagram of a processing system that can be used to implement various embodiments.

FIG. 12 is a block diagram of a processing system 1200 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1200 may comprise a processing unit 1201 equipped with one or more input/output devices, such as a speaker, microphone, mouse, touchscreen, keypad, keyboard, printer, display, and the like. The processing unit 1201 may include a central processing unit (CPU) 1210, a memory 1220, a mass storage device 1230, a video adapter 1240, and an I/O interface 1260 connected to a bus. The bus may be one or more of any type of several bus architectures including a memory bus or memory controller, a peripheral bus, a video bus, or the like.

The CPU 1210 may comprise any type of electronic data processor. The memory 1220 may comprise any type of system memory such as static random access memory (SRAM), dynamic random access memory (DRAM), synchronous DRAM (SDRAM), read-only memory (ROM), a combination thereof, or the like. In an embodiment, the memory 1220 may include ROM for use at boot-up, and DRAM for program and data storage for use while executing programs. In embodiments, the memory 1220 is non-transitory. The mass storage device 1230 may comprise any type of storage device configured to store data, programs, and other information and to make the data, programs, and other information accessible via the bus. The mass storage device 1230 may comprise, for example, one or more of a solid state drive, hard disk drive, a magnetic disk drive, an optical disk drive, or the like.

The video adapter 1240 and the I/O interface 1260 provide interfaces to couple external input and output devices to the processing unit. As illustrated, examples of input and output devices include a display 1290 coupled to the video adapter 1240 and any combination of mouse/keyboard/printer 1270 coupled to the I/O interface 1260. Other devices may be coupled to the processing unit 1201, and additional or fewer interface cards may be utilized. For example, a serial interface card (not shown) may be used to provide a serial interface for a printer.

The processing unit 1201 also includes one or more network interfaces 1250, which may comprise wired links, such as an Ethernet cable or the like, and/or wireless links to access nodes or one or more networks 1280. The network interface 1250 allows the processing unit 1201 to communicate with remote units via the networks 1280. For example, the network interface 1250 may provide wireless communication via one or more transmitters/transmit antennas and one or more receivers/receive antennas. In an embodiment, the processing unit 1201 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing data content, the method comprising:
    compressing, by a radio access node, a plurality of current segments of at least one Group of Pictures (GOP) from a corresponding plurality of original segments of the at least one GOP for a same media content stream;
    encoding the plurality of compressed current segments of the at least one GOP from the corresponding plurality of original segments of the at least one GOP and a plurality of compressed and encoded preceding segments of the at least one GOP, wherein each of the compressed and encoded current segments of the at least one GOP forms a reduced redundancy representation of a corresponding original segment of the at least one GOP; and
    delivering the data content by transmitting, by the radio access node to a client network component, a sequence of data segments, wherein the sequence of data segments is a combination of a subset of the plurality of compressed and encoded current segments of the at least one GOP and a subset of the plurality of original segments of the at least one GOP for the same media content stream.

2. The method of claim 1 further comprising transmitting each of the plurality of compressed and encoded current segments of the at least one GOP upon receiving an acknowledgment (ACK) message that indicates successful transmission of a previous compressed and encoded segment or original segment of the at least one GOP in the sequence of data segments.

3. The method of claim 1 further comprising:
    removing redundant data between the plurality of compressed current segments of the at least one GOP; and
    further encoding the plurality of compressed current segments of the at least one GOP depending on preceding compressed segments of the at least one GOP in the sequence of data segments.

4. The method of claim 3, wherein each of the plurality of compressed current segments of the at least one GOP are encoded consecutively upon successfully transmitting a previous compressed and encoded segment or original segment of the at least one GOP in the sequence of data segments.

5. The method of claim 1, wherein encoding the plurality of compressed current segments of the at least one GOP includes;
    encoding each of the plurality of compressed and encoded preceding segments of the at least one GOP and the corresponding plurality of original segments of the at least one GOP independently; and compressing using bit or symbol compression, the plurality of encoded original segments of the at least one GOP with the plurality of compressed current segments of the at least one GOP that are subsequent to the corresponding plurality of original segments of the at least one GOP in the sequence of data segments.

6. The method of claim 5, wherein each of the plurality of compressed current segments of the at least one GOP are compressed consecutively upon successfully transmitting a previous original segment or a previously compressed and encoded segment of the at least one GOP in the sequence of data segments.

7. The method of claim 1 further comprising:
receiving a request, from the client network component, to download the data, content;
transmitting, by the radio access node:
   an original segment or a first compressed and encoded segment of the at least one GOP in the sequence of data segments; and
   a second compressed and encoded segment of the at least one GOP subsequent to the original segment or the first compressed and encoded segment of the at least one GOP in the sequence of data segments if an acknowledgement (ACK) message is received from the client network component; or
   another original segment of the at least one GOP subsequent to the original segment or the first compressed and encoded segment of the at least one GOP in the sequence of data segments if the ACK message is not received or if the second compressed and encoded segment of the at least one GOP is not available.

8. The method of claim 1 further comprising:
receiving, by the radio access node, a request from the client network component to download the data content;
transmitting, by the radio access node:
   an original segment or a first compressed and encoded segment of the at least one GOP in the sequence of data segments; and
   a second compressed and encoded segment of the at least one GOP subsequent to the first compressed and encoded segment or the original segment of the at least one GOP in the sequence of data segments if an acknowledgement (ACK) message is received from the client network component, or retransmitting the first compressed and encoded segment or the original segment of the at least one GOP in the sequence or data segments if the ACK message is not received.

9. The method of claim 1 further comprising:
receiving, by the radio access node, a request from the client network component to download the data content;
transmitting, by the radio access node:
   a first compressed and encoded segment or an original segment of the at least one GOP in the sequence of data segments; and
   a second compressed and encoded segment of the at least one GOP subsequent to the first compressed and encoded segment or the original segment of the at least one GOP in the sequence of data segments if an acknowledgement (ACK) message is received from the client network component, or a codebook comprising codewords of one or more last transmitted segment of the at least one GOP if the ACK message is not received.

10. The method of claim 1, wherein the data content is a media representation, the plurality of original segments of the at least one GOP are regular segments of the media representation, and the plurality compressed and encoded current segments of the at least one GOP are auxiliary media representations, wherein each segment in the auxiliary media representation is a reduced redundancy representation of each segment in the regular segments of the media representation.

11. A network component for providing data content, the network component comprising;
a processor; and
a computer readable storage medium storing programming for execution by the processor, the programming including instructions to:
   compress a plurality of current segments of at least one Group of Pictures (GOP) from a corresponding plurality of original segments of the at least one GOP for a same media content stream;
   encode the plurality of compressed current segments of the at least one GOP from the corresponding plurality of original segments of the at least one GOP and a plurality of compressed and encoded preceding segments of the at least one GOP, wherein each of the compressed and encoded current segments of the at least one GOP forms a reduced redundancy representation of a corresponding original segment of the at least one GOP; and
   deliver the data content by transmitting a sequence of data segments, wherein the sequence of data segments is a combination of a subset of the plurality of compressed and encoded current segments of the at least one GOP and a subset of the corresponding plurality of original segments of the at least one GOP for the same media content stream.

12. The network component of claim 11, wherein each of the plurality of compressed and encoded current segments of the at least one GOP is transmitted upon receiving an acknowledgment (ACK) message that indicates successful transmission of a previous original segment or a previous compressed and encoded segment of the at least one GOP in the sequence of data segments.

13. The network component of claim 11, wherein the programming includes further instructions to:
convert a plurality of other original segments of the at least one GOP supported by a media player of the network component into a corresponding plurality of compressed and encoded current segments of the at least one GOP, wherein the plurality of other original segments of the at least one GOP are converted between an application layer and a Hypertext Transfer Protocol (HTTP) or Real-Time Protocol (RTP) layer; and
transmit the corresponding plurality of compressed and encoded current segments of the at least one GOP.

14. The network component of claim 11, wherein the programming includes further instructions to:
convert a plurality of other original segments of the at least one GOP supported by a media player of the network component into a corresponding plurality of compressed and encoded current segments of the at least one GOP, wherein the plurality of other original segments of the at least one GOP are converted between a Transport Control Protocol (TCP) or User Datagram Protocol (UDP) layer and an Internet Protocol (IP) layer; and transmit the corresponding plurality of compressed and encoded current segments of the at least one GOP.

15. The network component of claim 11, wherein the corresponding plurality of original segments of the at least one GOP are cached locally at the network component, and wherein the plurality of compressed and encoded current segments of the at least one GOP are compressed and encoded consecutively upon transmitting each previous compressed and encoded segment of the at least one GOP in the sequence of data segments.

16. A method for obtaining data content, the method comprising:
sending, by a client network component to a radio access node, a request to download the data content;
receiving, by the client network component from the radio access node, the data content as a sequence of data segments, wherein the sequence of data segments is a combination of a subset of a plurality of compressed and encoded current segments of at least one Group of Pictures (GOP) and a subset of a plurality of original segments of the at least one GOP for a same media content stream;
determining, by the client network component, the plurality of compressed and encoded current segments of the at least one GOP, wherein the plurality of compressed and encoded current segments of the at least one GOP are encoded representations of a plurality of compressed current segments of the at least one GOP and a plurality of preceding compressed and encoded segments of the at least one GOP;
determining, by the client network component, the plurality of compressed current segments of the at least one GOP, wherein the plurality of compressed current segments of the at least one GOP are a compressed version of a corresponding plurality of original segments of the at least one GOP;
sending, by the client network component to the radio access node, an acknowledgement (ACK) message for each successfully received sequence of data segments; and
receiving, by the client network component from the radio access node, a next compressed and encoded segment of the at least one GOP in the sequence of data segments in response to sending the ACK message.

17. The method of claim 16 further comprising:
receiving, by the client network component, a next original segment of the at least one GOP it the ACK message is not sent.

18. The method of claim 16 further comprising:
receiving, by the client network component, a last transmitted original segment of the at least one GOP or a last transmitted compressed and encoded segment of the at least one GOP if the ACK message is not sent.

19. The method of claim 16 further comprising:
receiving, by the client network component, a codebook comprising codewords of one or more lost or failed transmitted segments of data if the ACK message is not sent.

20. The method of claim 16 further comprising sending a message to indicate an encoding mode for the plurality of original segments of the least one GOP or the plurality of compressed and encoded current segments of the at least one GOP.

21. The method of claim 16 further comprising sending a message to indicate a bit compression mode for the plurality of original segments of the least one GOP or the plurality of compressed and encoded current segments of the at least one GOP.

22. The method of claim 16, wherein the request indicates a bit rate for the data content.

23. The method of claim 16, wherein the data content is a media representation, the plurality of original segments of the at least one GOP are regular segments of the media representation, and the plurality of compressed and encoded current segments of the at least one GOP are auxiliary media representations, wherein each segment in the auxiliary media representation is a reduced redundancy representation of each segment in the regular segments of the media representation.

24. A client network component for obtaining data content, the client network component comprising: a processor; and
a computer readable storage medium storing programming for execution by the processor, the programming including instructions to:
send, to a radio access node, a request to download the data content;
receive, from the radio access node, the data content, wherein the data content is a combination of a subset of a plurality of compressed and encoded current segments of at least one Group of Pictures (GOP) and a subset of a plurality of original segments of the at least one GOP for a same media content stream;
determine the plurality of compressed and encoded current segments of the at least one GOP, wherein the plurality of compressed and encoded current segments of the at least one GOP are encoded representations of a plurality of compressed current segments of the at least one GOP and a plurality of compressed and encoded preceding segments of the at least one GOP;
determine the plurality of compressed current segments of the at least one GOP, wherein the plurality of compressed current segments of the at least one GOP are a compressed version of a corresponding plurality of or segments of the at least one GOP; and
send, to the radio access node, an acknowledgement (ACK) message for each
successfully received compressed and encoded current segment or original segment of the at least one GOP; and
receive, from the radio access node, a next compressed and encoded segment of the at least one GOP upon sending the ACK message.

25. The client network component of claim 24, wherein the programming includes further instructions to:
receive a next original segment of the at least one GOP if the ACK message is not sent.

26. The client network component of claim 24, wherein the programming includes further instructions to:
receive a plurality of other compressed and encoded segments of the at least one GOP; and
convert the plurality of other compressed and encoded segments of the at least one GOP into a corresponding plurality of other original segments of the at least one GOP supported by a media player of the client network component, wherein the plurality of other compressed and encoded segments of the at least one GOP are converted between a Hypertext Transfer Protocol (HTTP) or Real-Time Protocol (RTP) layer and an application layer.

27. The client network component of claim 24, wherein the programming includes Further instructions to:

receive a plurality of other compressed and encoded segments of the at least one GOP; and convert the plurality of other compressed and encoded segments of the at least one GOP into a corresponding plurality of other original segments of the at least one GOP supported by a media player of the client network component, wherein the plurality of other compressed and encoded segments of the at least one GOP are converted between an Internet Protocol (IP) layer and a Transport Control Protocol (TCP) or User Datagram Protocol (UDP) layer.

28. A radio access node for transporting data content, the radio access node comprising:

a processor; and a computer readable storage medium storing programming for execution by the processor, the programming including instructions to:

receive a User Datagram Protocol (UDP) packet sent from a server in a sequence of received UDP packets for delivering the data content, the sequence of received UDP packets comprising a plurality of original segments of at least one Group of Picture (GOP) and a plurality of compressed and encoded current segments of the at least one GOP, wherein each of the compressed and encoded current segments of the at least one GOP is encoded by removing redundant information included in the plurality of original segments of the at least one GOP in the sequence of received UDP packets, and wherein a combination of a subset of the plurality of compressed and encoded current segments of the at least one GOP and a subset of the plurality of original segments of the at least one GOP in the sequence of received UDP packets form the data content for a same media content stream;

forward the UDP packet to a client;

forward an acknowledgement (ACK) message from the client to the server upon successfully forwarding the UDP packet to the client; and forward a next UDP packet comprising a next compressed and encoded segment of the at least one GOP from the server to the client, upon forwarding the ACK message.

29. A radio access node for transporting data content, the radio access node comprising:

a processor; and a computer readable storage medium storing programming for execution by the processor, the programming including instructions to:

receive a sequence of data segments for the data content from a server including a plurality of compressed and encoded current segments of at least one Group of Pictures (GOP) and a plurality of original segments of the at least one GOP, wherein the plurality of compressed and encoded current segments of the at least one GOP are encoded in accordance with information in the plurality of original segments of the at least one GOP in the sequence of data segments, and wherein a combination of a subset of the plurality of compressed and encoded current segments of the at least one GOP and a subset of the plurality of original segments of the at least one GOP form the data content for a same media content stream;

convert the plurality of compressed and encoded current segments of the at least one GOP into a corresponding plurality of current segments of data supported by a media player at a client, wherein the plurality of compressed and encoded current segments of the at least one GOP have less redundant data than the corresponding plurality of current segments of data;

transmit the sequence of data segments including a subset of the corresponding plurality of current segments of data and a subset of the plurality of original segments of the at least one GOP for the same media content stream to the client;

forward an acknowledgement (ACK) message from the client to the server upon successfully transmitting each current segment of data in the sequence of data segments; and forward a next compressed and encoded segment of the at least one GOP from the server to the client, upon forwarding the ACK message.

30. A radio access node for transporting data content, the radio access node comprising:

a processor; and a computer readable storage medium storing programming for execution by the processor, the programming including instructions to:

receive a sequence of data segments for the data content from a server, the sequence of data segments comprising a plurality of first segments of data and a plurality of second segments of data;

convert the plurality of first segments of data in the sequence of data segments into a corresponding plurality of compressed and encoded current segments of the at least one Group of Pictures (GOP), wherein the corresponding plurality of compressed and encoded current segments of the at least one GOP have less redundant data than the first segments of data and are encoded in accordance with the plurality of second segments of data in the sequence of data segments, and wherein a combination of a subset of the corresponding plurality of compressed and encoded current segments of the at least one GOP and a subset of the plurality of second segments of data form the data content for a same media content stream;

transmit the sequence of data segments including a subset of the corresponding plurality of compressed and encoded current segments of the at least one GOP and a subset of the plurality of second segments of data to a client;

forward an acknowledgement (ACK) message from the client to the server upon successfully transmitting each current segment of data in the sequence of data segments; and forward a next compressed and encoded segment of the at least one GOP from the server to the client, upon forwarding the ACK message.

31. The radio access node of claim 30, wherein the plurality of first segments or data are converted consecutively upon transmitting each previous segment of data in the sequence of data segments.

32. The radio access node of claim 30, wherein the sequence of data segments including the plurality of first segments of data and the corresponding plurality of compressed and encoded current segments of the at least one GOP are cached locally at the radio access node.

* * * * *

UNITED STATES PATENT AND TRADEMARK OFFICE
CERTIFICATE OF CORRECTION

PATENT NO. : 9,894,421 B2  
APPLICATION NO. : 13/657559  
DATED : February 13, 2018  
INVENTOR(S) : Ngoc Dung Dao et al.

It is certified that error appears in the above-identified patent and that said Letters Patent is hereby corrected as shown below:

In Column 13, Line 15, Claim 7, delete "data, content;" and insert --data content;--.

In Column 13, Line 49-50, Claim 8, delete "sequence or data segments" and insert --sequence of data segments--.

In Column 16, Line 39, Claim 24, delete "plurality of or" and insert --plurality of original--.

In Column 16, Line 67, Claim 27, delete "Further" and insert --further--.

Signed and Sealed this  
Eighth Day of May, 2018

Andrei Iancu  
*Director of the United States Patent and Trademark Office*